US012280004B1

(12) United States Patent
Zhao et al.

(10) Patent No.: US 12,280,004 B1
(45) Date of Patent: Apr. 22, 2025

(54) SEXUAL STIMULATION MASSAGE DEVICE

(71) Applicants: Dongguan Yishuo Electronic Technology Co., Ltd., Guangdong (CN); Shenzhen Envision Technology Innovation Co., Ltd., Guangdong (CN)

(72) Inventors: Quan Zhao, Guangdong (CN); Lang Cun, Guangdong (CN)

( * ) Notice: Subject to any disclaimer, the term of this patent is extended or adjusted under 35 U.S.C. 154(b) by 0 days.

(21) Appl. No.: 18/891,639

(22) Filed: Sep. 20, 2024

(30) Foreign Application Priority Data

Aug. 22, 2024 (CN) ......................... 202422038085.4

(51) Int. Cl.
*A61H 19/00* (2006.01)
*A61H 23/02* (2006.01)

(52) U.S. Cl.
CPC ......... *A61H 19/34* (2013.01); *A61H 23/0254* (2013.01); *A61H 2201/1215* (2013.01); *A61H 2201/1666* (2013.01); *A61H 2201/1676* (2013.01); *A61H 2201/1692* (2013.01); *A61H 2205/087* (2013.01)

(58) Field of Classification Search
CPC .......... A61H 19/00-50; A61H 23/0254; A61H 2201/1215; A61H 2201/1666; A61H 2201/1676; A61H 2201/1692; A61H 2205/087
USPC ........................................................... 600/38
See application file for complete search history.

(56) References Cited

U.S. PATENT DOCUMENTS

| | | | | | |
|---|---|---|---|---|---|
| 5,076,261 | A * | 12/1991 | Black | A61H 19/44 601/93 | |
| 11,826,300 | B1 * | 11/2023 | Zhou | A61H 19/34 | |
| 12,064,386 | B1 * | 8/2024 | Yan | A61H 23/02 | |
| 2016/0120737 | A1* | 5/2016 | Sedic | A61H 19/44 601/46 | |
| 2018/0140504 | A1* | 5/2018 | Chang | A61H 99/00 | |
| 2021/0393475 | A1* | 12/2021 | He | A61H 19/34 | |
| 2024/0299239 | A1* | 9/2024 | Yan | A61H 19/30 | |
| 2024/0307261 | A1* | 9/2024 | Wang | A61H 7/002 | |
| 2024/0342053 | A1* | 10/2024 | Li | A61H 19/44 | |

* cited by examiner

*Primary Examiner* — Valerie L Woodward
*Assistant Examiner* — Paige Kathleen Bugg

(57) ABSTRACT

A sexual stimulation massage device belongs to the technical field of massagers, comprising a silicone cover, a first housing is arranged inside the silicone cover, a massage assembly is arranged inside the first housing, the massage assembly comprises a drive motor, a drive shaft, and massage heads, the massage heads are provided with two or more. The invention provides an efficient and comfortable massage experience by combining the functions of wave-like striking, vibration and swinging.

8 Claims, 4 Drawing Sheets

SEXUAL STIMULATION MASSAGE DEVICE

1. TECHNICAL FIELD

The invention relates to the technical field of massagers, in particular to a sexual stimulation massage device.

2. BACKGROUND ART

The busy, exhausting, and stressful nature of modern work can lead to heightened nervous tension, resulting in normal functional fatigue and decline. Adult massagers are devices designed for personal relaxation and pleasure, typically used to stimulate and soothe certain parts of the body. They can come in various designs and functions, such as vibration and rotation, to cater to different needs and preferences.

Based on the above, the inventor has discovered that traditional massagers only address certain functions, but lack a striking function and comfort, resulting in a poor user experience. Therefore, in light of this, the invention researches and improves the existing structure, and proposes a sexual stimulation massage device to address the aforementioned problems.

3. SUMMARY OF THE INVENTION

The technical problem to be solved by the invention is that the traditional massagers don't have a striking function and have a poor user experience.

In order to achieve the above problems, the invention provides the following technical scheme: a sexual stimulation massage device comprises a silicone cover, a first housing is arranged inside the silicone cover, wherein a massage assembly is arranged inside the first housing, the massage assembly comprises a drive motor, a drive shaft, and massage heads, the massage heads are provided with two or more.

Further, the first housing is provided with limiting slots inside, and each massage head is placed within the corresponding limiting slot, the first housing is provided with second through slots, each second through slot communicates with the corresponding limiting slot, and a rod portion of each massage head is arranged within the corresponding second through slot, an upper end of each massage head extends to an outside of the first housing and is located inside the silicone cover.

Further, the drive motor is positioned inside the first housing and is fixedly connected to the first housing, an output end of the drive motor is fixedly connected to the drive shaft, and the other end of the drive shaft is rotatably connected within a second through hole inside the first housing.

Further, a lower end of each massage head is provided with a first through slot, the drive shaft is positioned within the first through slots, radii of the drive shaft are different, the drive shaft coordinates with two or more massage heads to create multiple stimulating points, they move up and down asynchronously.

Further, the drive shaft has an S-shaped structure, the upper end of each massage head is provided with notches on both sides, an inner diameter of the second through slot matches an outer diameter of the notch on the rod portion of the massage head, a top of each massage head has a hemispherical structure.

Further, a vibration assembly is arranged on one side of the massage assembly and at a head position of the silicone cover, the vibration assembly comprises a second housing embedded in the silicone cover and a vibration motor, the vibration motor is fixedly connected inside the second housing.

Further, a swinging assembly designed to work with the massage assembly is arranged above the massage assembly, the swinging assembly comprises a motor, a plastic eccentric wheel, and a plastic upper labia swinging member, a third housing is embedded inside the silicone cover, and the plastic upper labia swinging member is rotatably connected to the third housing via connecting rods on both sides.

Further, the motor is fixedly connected inside the third housing, an output end of the motor is fixedly connected to the plastic eccentric wheel, a groove is arranged on an inner side of the plastic upper labia swinging member, the plastic eccentric wheel is placed within the groove.

Further, the plastic upper labia swinging member is placed outside the third housing and inside the silicone cover, the third housing is connected to the first housing via a silicone neck-shaped part.

Further, the first housing and the third housing are respectively provided with first slots and second slots, and protrusions of the silicone neck-shaped part are respectively placed in the first slots and the second slots.

By adopting the above technical scheme, the invention has the following advantageous effects:

1. through the coordinated operation of the massage assembly, the swinging assembly, and the vibration assembly, various massage effects can be achieved, thereby enhancing the comfort and effectiveness of the massage;
2. the connection between the first housing and the second housing through the slots and the silicone neck-shaped part ensures the stability of the overall structure, increasing the durability of the massage device; the design of the silicone cover makes the massager more comfortable and suitable for extended use.

4. BRIEF DESCRIPTION OF ACCOMPANY DRAWINGS

The accompanying drawings are used to provide a further understanding of the invention and constitute a part of the specification; together with the embodiments of the invention, they are used to explain the invention and do not constitute a limitation of the invention.

1 first housing; 2 second housing; 3 third housing; 4 silicone neck-shaped part; 5 vibration motor; 6 drive motor; 7 drive shaft; 8 massage head; 9 limiting slot; 10 second through slot; 11 second through hole; 12 first through slot;

13 motor; 14 plastic eccentric wheel; 15 plastic upper labia swinging member; 16 first slot; 17 second slot; 18 connecting rod; 19 groove; 20 notch.

5. SPECIFIC EMBODIMENT OF THE INVENTION

The technical schemes in the embodiments of the invention will be clearly and completely described in combination with the accompanying drawings in the embodiments of the invention. Obviously, the described embodiments are only some of the embodiments of the invention, but not all of the embodiments. Based on the embodiments in this invention, all other embodiments obtained by those of ordinary skill in the art without making creative efforts shall fall within the protection scope of this invention.

The invention fully explains the problems of the prior art in the technical background, and there are no overly general or vague problems. The following content and specific embodiments of the invention specifically describe the problems to be solved by the invention, clarify the technical problems to be solved by the technical scheme, and determine that the technical scheme of the invention has beneficial effects relative to the objective prior art.

Figure 1:
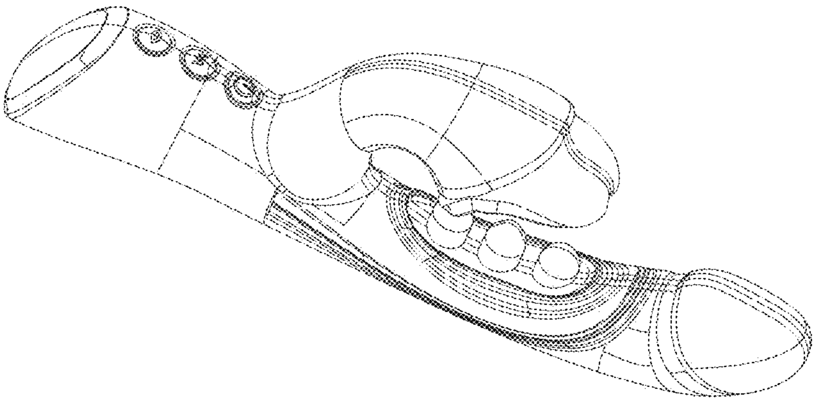
FIG. 1 is a stereoscopic view of the sexual stimulation massage device of the invention.
Figure 2:
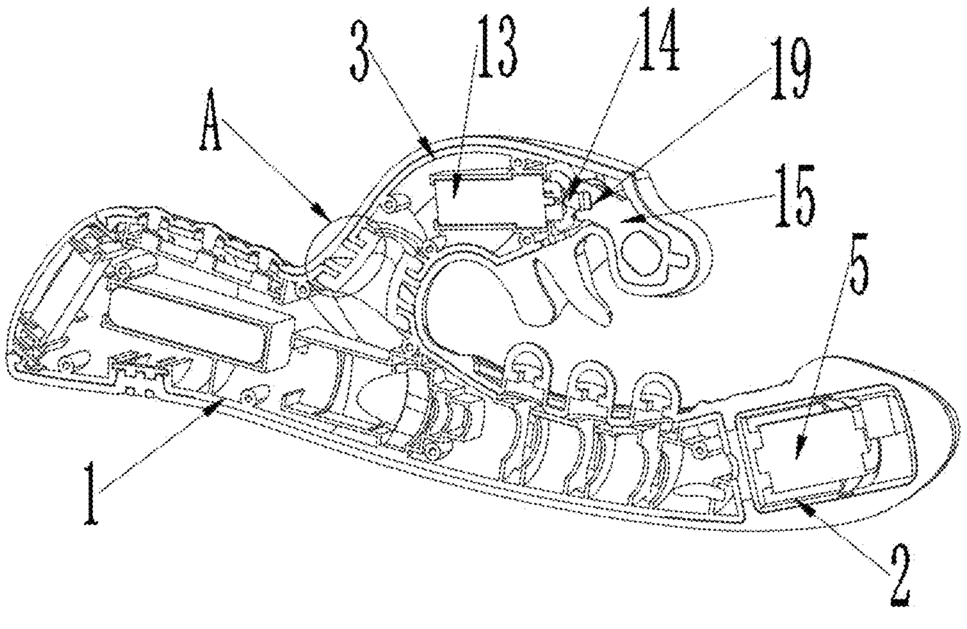
FIG. 2 is a stereoscopic view 1 of an interior of the sexual stimulation massage device of the invention.
Figure 3:
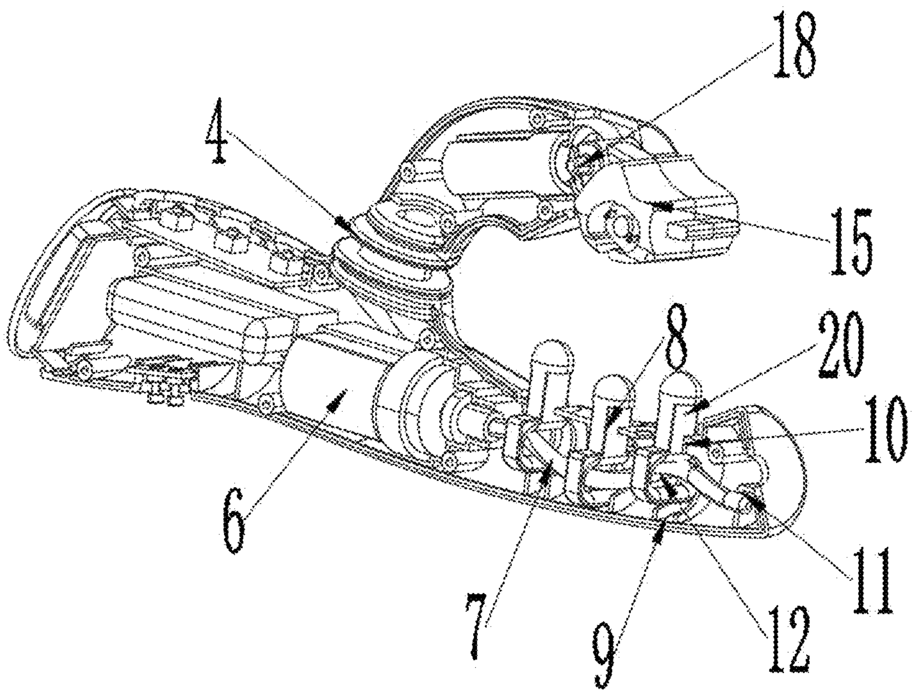
FIG. 3 is a stereoscopic view 2 of the interior of the sexual stimulation massage device of the invention.
Figure 4:
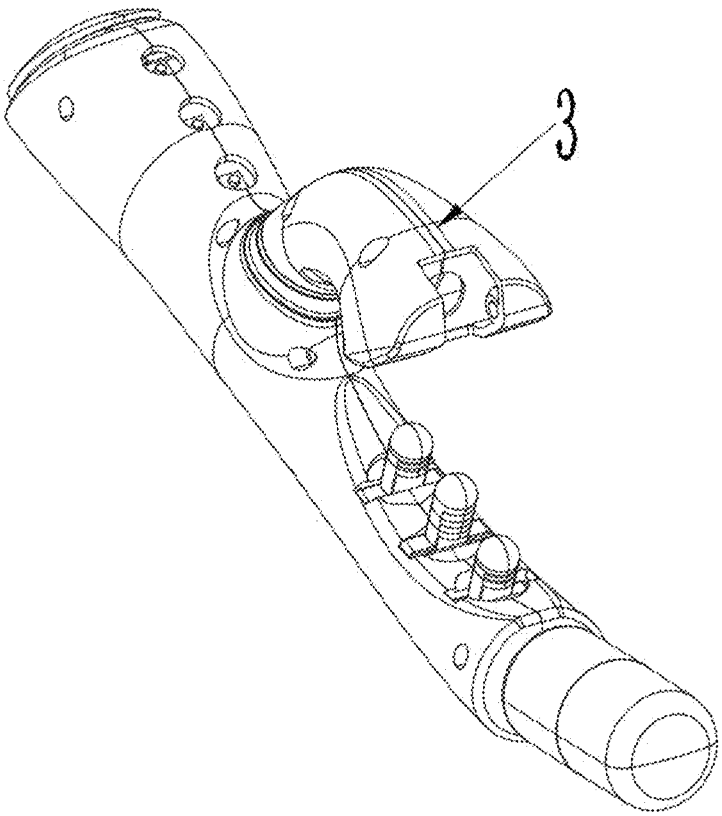
FIG. 4 is a partial stereoscopic view of the sexual stimulation massage device of the invention.
Figure 5:
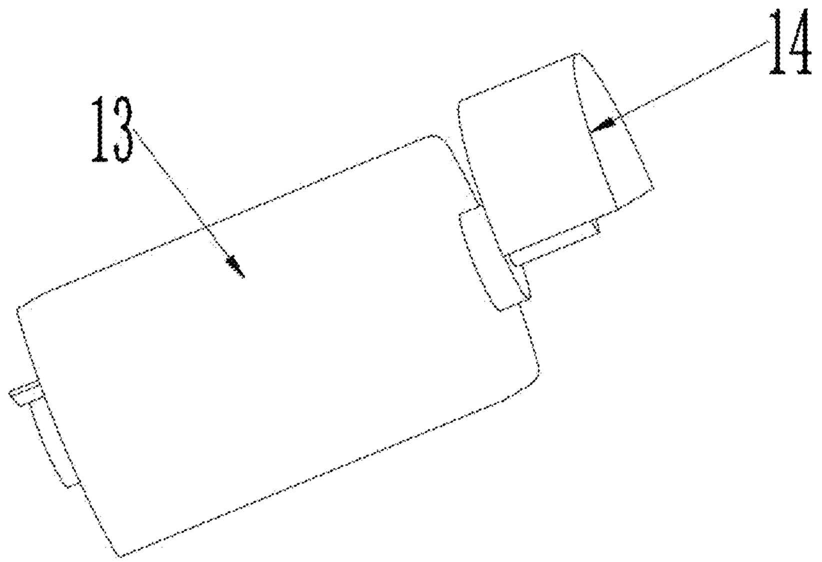
FIG. 5 is a stereoscopic view of the plastic eccentric wheel in the sexual stimulation massage device of the invention.
Figure 6:
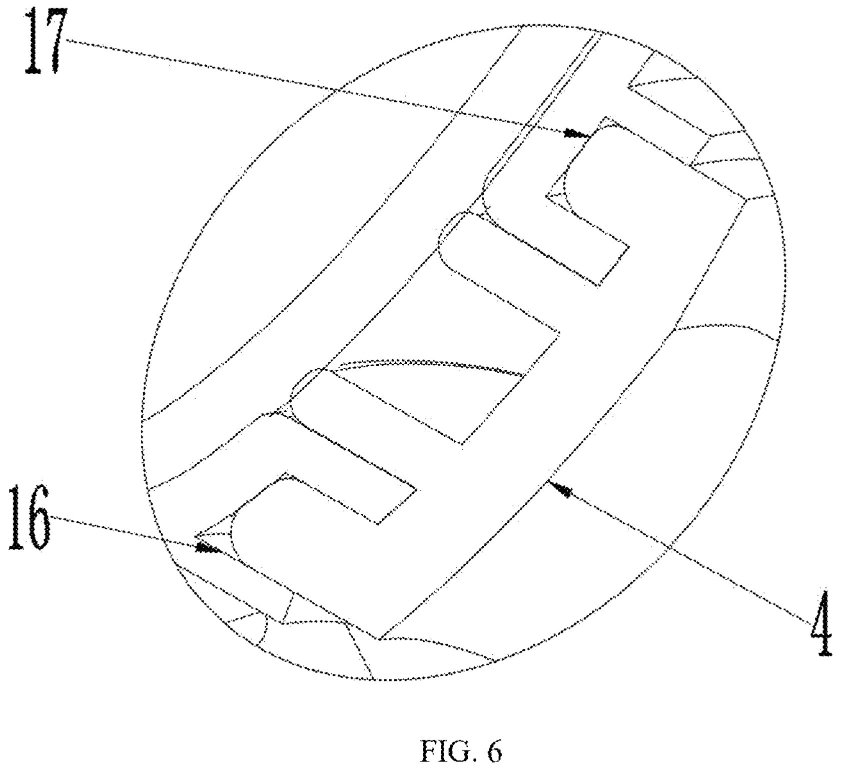
FIG. 6 is a stereoscopic view of a part A in the sexual stimulation massage device of the invention.
Figure 7:
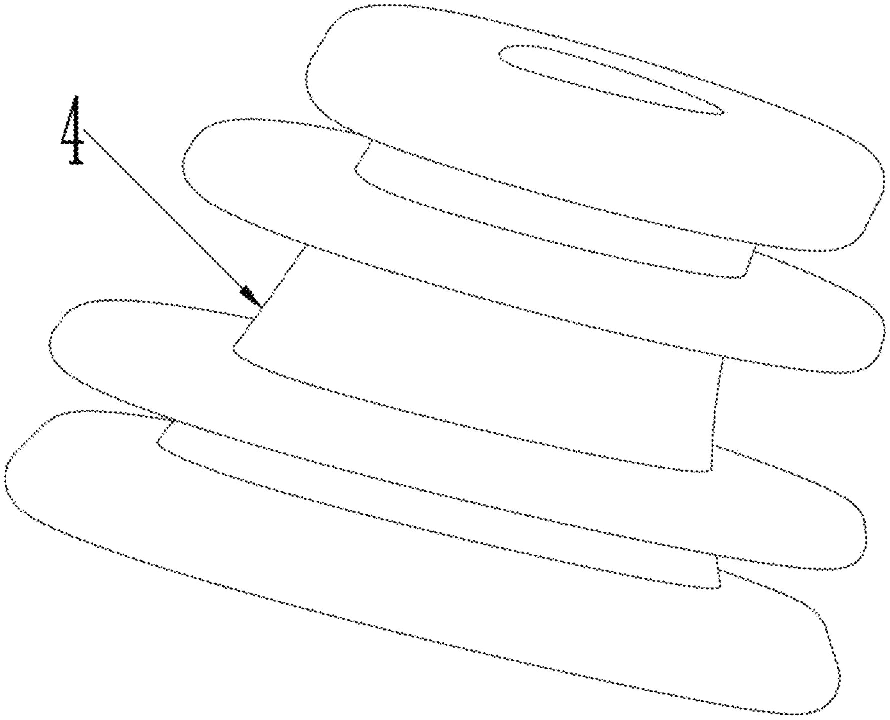
FIG. 7 is a stereoscopic view of the silicone neck-shaped part in the sexual stimulation massage device of the invention.

Please refer to FIG. 1-FIG. 2, the invention provides a sexual stimulation massage device, comprising a silicone cover, a first housing 1 is arranged inside the silicone cover, wherein a massage assembly is arranged inside the first housing 1, the massage assembly comprises a drive motor 6, a drive shaft 7, and massage heads 8, the massage heads 8 are provided with two or more.

The first housing 1 is provided with limiting slots 9 inside, and each massage head 8 is placed within the corresponding limiting slot 9, the first housing 1 is provided with second through slots 10, each second through slot 10 communicates with the corresponding limiting slot 9, and a rod portion of each massage head 8 is arranged within the corresponding second through slot 10, an upper end of each massage head 8 extends to an outside of the first housing 1 and is located inside the silicone cover.

The drive motor 6 is positioned inside the first housing 1 and is fixedly connected to the first housing 1, an output end of the drive motor 6 is fixedly connected to the drive shaft 7, and the other end of the drive shaft 7 is rotatably connected within a second through hole 11 inside the first housing 1.

A lower end of each massage head 8 is provided with a first through slot 12, the drive shaft 7 is positioned within the first through slots 12, radii of the drive shaft 7 are different, the drive shaft 7 coordinates with two or more massage heads 8 to create multiple stimulating points, they move up and down asynchronously.

The drive shaft 7 has an S-shaped structure, the upper end of each massage head 8 is provided with notches 20 on both sides, an inner diameter of the second through slot 10 matches an outer diameter of the notch 20 on the rod portion of the massage head 8, a top of each massage head 8 has a hemispherical structure.

A vibration assembly is arranged on one side of the massage assembly and at a head position of the silicone cover, the vibration assembly comprises a second housing 2 embedded in the silicone cover and a vibration motor 5, the vibration motor 5 is fixedly connected inside the second housing 2.

A swinging assembly designed to work with the massage assembly is arranged above the massage assembly, the swinging assembly comprises a motor 13, a plastic eccentric wheel 14, and a plastic upper labia swinging member 15, a third housing 3 is embedded inside the silicone cover, and the plastic upper labia swinging member 15 is rotatably connected to the third housing 3 via connecting rods 18 on both sides.

The motor 13 is fixedly connected inside the third housing 3, an output end of the motor 13 is fixedly connected to the plastic eccentric wheel 14, a groove 19 is arranged on an inner side of the plastic upper labia swinging member 15, the plastic eccentric wheel 14 is placed within the groove 19.

The plastic upper labia swinging member 15 is placed outside the third housing 3 and inside the silicone cover, the third housing 3 is connected to the first housing 1 via a silicone neck-shaped part 4.

The first housing 1 and the third housing 3 are respectively provided with first slots 16 and second slots 17, and protrusions of the silicone neck-shaped part 4 are respectively placed in the first slots 16 and the second slots 17.

The principle of the sexual stimulation massage device of the invention is as follows:

the drive motor is started to drive the drive shaft to rotate; the drive shaft, which passes the first through slot, drives the massage heads to move within the limiting slots and the second through slots, causing the massage heads to move up and down; the motor is started to drive the plastic eccentric wheel within the groove, which then causes the plastic upper labia swinging member to swing under the action of the connecting rods; the plastic upper labia swinging member and the massage heads are located within the silicone cover; the vibration motor causes the second housing and the silicone cover's head position to vibrate; during use, the silicone contacting the skin enhances comfort. Note that the invention must not be sold to minors.

The invention provides an efficient and comfortable massage experience by combining the functions of wave-like striking, vibration and swinging.

The invention and its embodiments are described above, this description is not restrictive, and what is shown in the accompanying drawing is only one of the embodiments of the invention, and the actual structure is not limited to this. All in all, if those skilled in the art receives its enlightenment, without deviating from the object of the invention, and without creatively designing structures and embodiments similar to the technical scheme of the invention shall fall within the protection scope of the invention.

The invention claimed is:

1. A sexual stimulation massage device, comprising a silicone cover, a first housing arranged inside the silicone cover, and a massage assembly is arranged inside the first housing, wherein the massage assembly comprises a drive motor, a drive shaft, and massage heads, wherein two or more massage heads are provided;

the first housing is provided with limiting slots inside, and each massage head is placed within one of the limiting slots, the first housing is provided with second through slots, each second through slot is configured to communicate with one of the limiting slots, and a rod portion of each massage head is configured to be arranged within one of the second through slots, an upper end of each massage head extends to an outside of the first housing and is located inside the silicone cover;

wherein a lower end of each massage head is provided with a first through slot, the drive shaft is configured to be positioned within each of the first through slots, radii of the drive shaft are configured to be different, the drive shaft is configured to coordinate with the two or more massage heads to create multiple stimulating points, the two or more massage heads are configured to move up and down asynchronously.

2. The sexual stimulation massage device of claim 1, wherein the drive motor is positioned inside the first housing and is fixedly connected to the first housing, an output end of the drive motor is fixedly connected to the drive shaft, and an end of the drive shaft opposite the drive motor is rotatably connected within a second through hole inside the first housing.

3. The sexual stimulation massage device of claim 1, wherein the drive shaft has an S-shaped structure, the upper end of each massage head is is configured to be provided with notches on both sides, an inner diameter of each second through slot is configured to match an outer diameter of the notches on the rod portion of each massage head, a top of each massage head has a hemispherical structure.

4. The sexual stimulation massage device of claim 1, wherein a vibration assembly is arranged on one side of the massage assembly and at a head position of the silicone cover, the vibration assembly comprises a second housing embedded in the silicone cover and a vibration motor, the vibration motor is fixedly connected inside the second housing.

5. The sexual stimulation massage device of claim 1, wherein a swinging assembly designed to work with the massage assembly is configured to be arranged above the massage assembly, the swinging assembly comprises a motor, a plastic eccentric wheel, and a plastic upper labia swinging member, a third housing is embedded inside the silicone cover, and the plastic upper labia swinging member is rotatably connected to the third housing via connecting rods on both sides.

6. The sexual stimulation massage device of claim 5, wherein the motor of the swinging assembly is fixedly connected inside the third housing, an output end of the motor of the swinging assembly is fixedly connected to the plastic eccentric wheel, a groove is arranged on an inner side of the plastic upper labia swinging member, the plastic eccentric wheel is placed within the groove.

7. The sexual stimulation massage device of claim 6, wherein the plastic upper labia swinging member is placed outside the third housing and inside the silicone cover, the third housing is connected to the first housing via a silicone neck-shaped part.

8. The sexual stimulation massage device of claim 7, wherein the first housing and the third housing are respectively provided with first slots and second slots, and protrusions of the silicone neck-shaped part are respectively placed in the first slots and the second slots.

* * * * *